US009749797B2

(12) United States Patent
Marti et al.

(10) Patent No.: US 9,749,797 B2
(45) Date of Patent: *Aug. 29, 2017

(54) MULTI-LEVEL VIRTUAL FENCE

(71) Applicant: Apple Inc., Cupertino, CA (US)

(72) Inventors: Lukas M. Marti, Santa Clara, CA (US); Shannon M. Ma, San Francisco, CA (US); Robert Mayor, Half Moon Bay, CA (US); Augustin Prats, San Francisco, CA (US); Brian J. Tucker, Sunnyvale, CA (US); Christopher J. Edmonds, San Francisco, CA (US); Joakim Linde, Palo Alto, CA (US); Pejman Lotfali Kazemi, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/263,248

(22) Filed: Sep. 12, 2016

(65) Prior Publication Data

US 2017/0070852 A1     Mar. 9, 2017

Related U.S. Application Data

(63) Continuation of application No. 14/826,172, filed on Aug. 13, 2015, now Pat. No. 9,445,235, which is a
(Continued)

(51) Int. Cl.
*H04W 4/02* (2009.01)
*H04W 8/18* (2009.01)
(Continued)

(52) U.S. Cl.
CPC .......... *H04W 4/021* (2013.01); *H04B 17/318* (2015.01); *H04W 4/008* (2013.01);
(Continued)

(58) Field of Classification Search
CPC ..... H04W 4/021; H04W 4/008; H04W 4/023; H04W 40/244; H04W 88/02; H04B 17/318
See application file for complete search history.

(56) References Cited

U.S. PATENT DOCUMENTS

| 7,873,349 B1 | 1/2011 | Smith et al. |
| 8,165,600 B2 * | 4/2012 | Walter ................. G06Q 10/087 455/456.1 |

(Continued)

OTHER PUBLICATIONS

Jennica Falk et al: "Pirates", CHI '01 Extended Abstracts on Human Factors in Computing Systems, CHI '01, Jan. 1, 2001 (Jan. 1, 2001), p. 119, XP055120752, New York, New York, USA DOI: 10.1145/634067.634140.

(Continued)

*Primary Examiner* — Marisol Figueroa
(74) *Attorney, Agent, or Firm* — Fish & Richardson P.C.

(57) ABSTRACT

A proximity fence can be a location-agnostic fence defined by signal sources having no geographic location information. The proximity fence can correspond to a group of signal sources instead of a point location fixed to latitude and longitude coordinates. A signal source can be a radio frequency (RF) transmitter broadcasting a beacon signal. The beacon signal can include a payload that includes an identifier indicating a category to which the signal source belongs, and one or more labels indicating one or more subcategories to which the signal source belongs. The proximity fence defined by the group of signal sources can trigger different functions of application programs associated with the proximity fence on a mobile device, when the mobile device moves within the proximity fence and enters and exits different parts of the proximity fence corresponding to the different subcategories.

20 Claims, 7 Drawing Sheets

Related U.S. Application Data continuation of application No. 14/191,330, filed on Feb. 26, 2014, now Pat. No. 9,113,300.

(60) Provisional application No. 61/790,813, filed on Mar. 15, 2013.

(51) Int. Cl.
*H04B 17/318* (2015.01)
*H04W 4/00* (2009.01)
*H04W 40/24* (2009.01)
*H04W 88/02* (2009.01)

(52) U.S. Cl.
CPC ............ *H04W 4/023* (2013.01); *H04W 8/18* (2013.01); *H04W 40/244* (2013.01); *H04W 88/02* (2013.01)

(56) References Cited

U.S. PATENT DOCUMENTS

| | | | |
|---|---|---|---|
| 8,369,837 B2 | 2/2013 | Huang et al. | |
| 9,113,300 B2* | 8/2015 | Marti | H04W 4/021 |
| 9,451,403 B2* | 9/2016 | Lyman | H04W 4/001 |
| 2005/0136845 A1 | 6/2005 | Masuoka et al. | |
| 2009/0170528 A1 | 7/2009 | Bull et al. | |
| 2011/0081918 A1 | 4/2011 | Burdo et al. | |
| 2011/0121963 A1 | 5/2011 | Prehofer | |
| 2011/0306304 A1 | 12/2011 | Forutanpour et al. | |
| 2012/0115512 A1 | 5/2012 | Grainger et al. | |
| 2012/0177010 A1 | 7/2012 | Huang et al. | |
| 2012/0215617 A1* | 8/2012 | Shah | G06Q 30/02 705/14.35 |
| 2012/0309413 A1* | 12/2012 | Grosman | H04W 64/006 455/456.1 |
| 2013/0006663 A1 | 1/2013 | Bertha et al. | |
| 2013/0093627 A1* | 4/2013 | Cosman | H04W 64/00 342/451 |
| 2014/0274150 A1 | 9/2014 | Marti et al. | |
| 2014/0364100 A1 | 12/2014 | Marti et al. | |

OTHER PUBLICATIONS

International Search Report and Written Opinion of the International Searching Authority, PCT Application Serial No. PCT/US2014/024958, Jun. 27, 2014, 10 pp.

Korean Office Action in Application No. 10-2015-7026377, dated Jun. 10, 2016, 13 pages.

* cited by examiner

MULTI-LEVEL VIRTUAL FENCE

CROSS REFERENCE TO RELATED APPLICATIONS

This application is a continuation of and claims priority to U.S. patent Ser. No. 14/826,172, entitled "Multi-Level Virtual Fence," filed on Aug. 13, 2015, which is a continuation of U.S. patent application Ser. No. 14/191,330, entitled "Proximity Fence," filed on Feb. 26, 2014, now issued as U.S. Pat. No. 9,113,300, issued on Aug. 18, 2015, which is a non-provisional of and claims priority to U.S. Provisional Patent Application No. 61/790,813, filed on Mar. 15, 2013, the entire contents of each of which are incorporated herein by reference.

TECHNICAL FIELD

This disclosure relates generally to geofencing.

BACKGROUND

Some mobile devices have features for providing location-based services. For example, a mobile device can execute a pre-specified application program or present certain content when the mobile device enters or exits a geofence. The geofence can be defined by a point location and a radius. The point location can have a longitude coordinate and a latitude coordinate. The mobile device can determine that the mobile device has entered the geofence or exited the geofence by determining an estimated location of the mobile device and calculating a distance between the estimated location and the point location. Based on whether the calculated distance exceeds the radius of the geofence, the mobile device can determine whether the mobile device entered or exited the geofence. The mobile device can determine the estimated location, which also includes a longitude coordinate and a latitude coordinate, using a global satellite system (e.g., GPS) or cellular triangulation.

SUMMARY

Techniques of proximity fence are described. A proximity fence can be a location-agnostic fence defined by signal sources having no geographic location information. The proximity fence can correspond to a group of signal sources instead of a point location fixed to latitude and longitude coordinates. A signal source can be a radio frequency (RF) transmitter broadcasting a beacon signal. The beacon signal can include a payload that includes an identifier indicating a category to which the signal source belongs, and one or more labels indicating one or more subcategories to which the signal source belongs. The proximity fence defined by the group of signal sources can trigger different functions of application programs associated with the proximity fence on a mobile device, when the mobile device moves within the proximity fence and enters and exits different parts of the proximity fence corresponding to the different subcategories. For example, the proximity fence can trigger a first function of an application program on a mobile device when the mobile device enters the proximity fence. The proximity fence can trigger a second function of the application program when the mobile device is located in proximity of (e.g., within a threshold distance of) a specific signal source in the group. Each signal source need not have geographic information on where the signal source or the mobile device is located. Likewise, the mobile device need not have geographic information on where the signal sources are located.

The features described in this specification can be implemented to achieve the following advantages. Compared to a conventional geofence, a proximity fence permits implementation of more complex location-based services. Rather than triggering an application program upon a geofence entry or a geofence exit, the proximity fence can trigger different application programs or different functions of an application program on a mobile device based on where the mobile device is located in the proximity fence. For example, the proximity fence can be defined to include a store. In addition, a first signal source of the proximity fence can be placed at a "tools" section of the store, and a second signal source of the proximity fence can be placed at an "appliances" section. The proximity fence can trigger a display a generic welcome message on a mobile device when the mobile device enters the store. In addition, the proximity fence can trigger a display of "tools" promotions when the mobile device, while in the proximity fence, reaches the "tools" section of the store, or a display of "appliances" promotions when the mobile device reaches the "appliances" section of the store.

Compared to a conventional geofence, a proximity fence permits higher granularity. Since a proximity fence can be defined by multiple signal sources sharing a category identifier, each of the signal sources can be a low-energy signal source having a short communication range (e.g., 50 meters or less, when attenuation by furniture, walls, or human body is accounted for). The short range allows for precise definition of the proximity fence, for example, by defining the proximity fence as a fence having an irregular shape instead of a simple circle defined by a center and a radius. The irregular shape can map to the architectural layout of a building. For example, a shopping mall can be a building having a large empty courtyard in the middle. The proximity fence can be defined by multiple signal sources placed in the building such that an application program is triggered when the mobile device enters the building but not when the mobile device is in the courtyard.

Compared to a conventional geofence, a proximity fence permits implementation of more flexible location-based services. A proximity fence can change behavior without requiring the proximity fence to be reprogrammed. For example, if a store implementing a proximity fence modifies a floor plan such that a "tools" section moves from one part of the store to another part, no reprogramming of the store proximity fence is necessary. The signal source associated with the "tools" section, if moved with the "tools" section, can trigger a display of "tools" promotions when a mobile device is in proximity with the new part of the store. The geographic location of the new "tools" section need not be provided to the mobile device.

The details of one or more implementations of proximity fence are set forth in the accompanying drawings and the description below. Other features, aspects, and advantages of proximity fence will become apparent from the description, the drawings, and the claims.

BRIEF DESCRIPTION OF THE DRAWINGS

Like reference symbols in the various drawings indicate like elements.

DETAILED DESCRIPTION

Exemplary Proximity Fence

Figure 1:
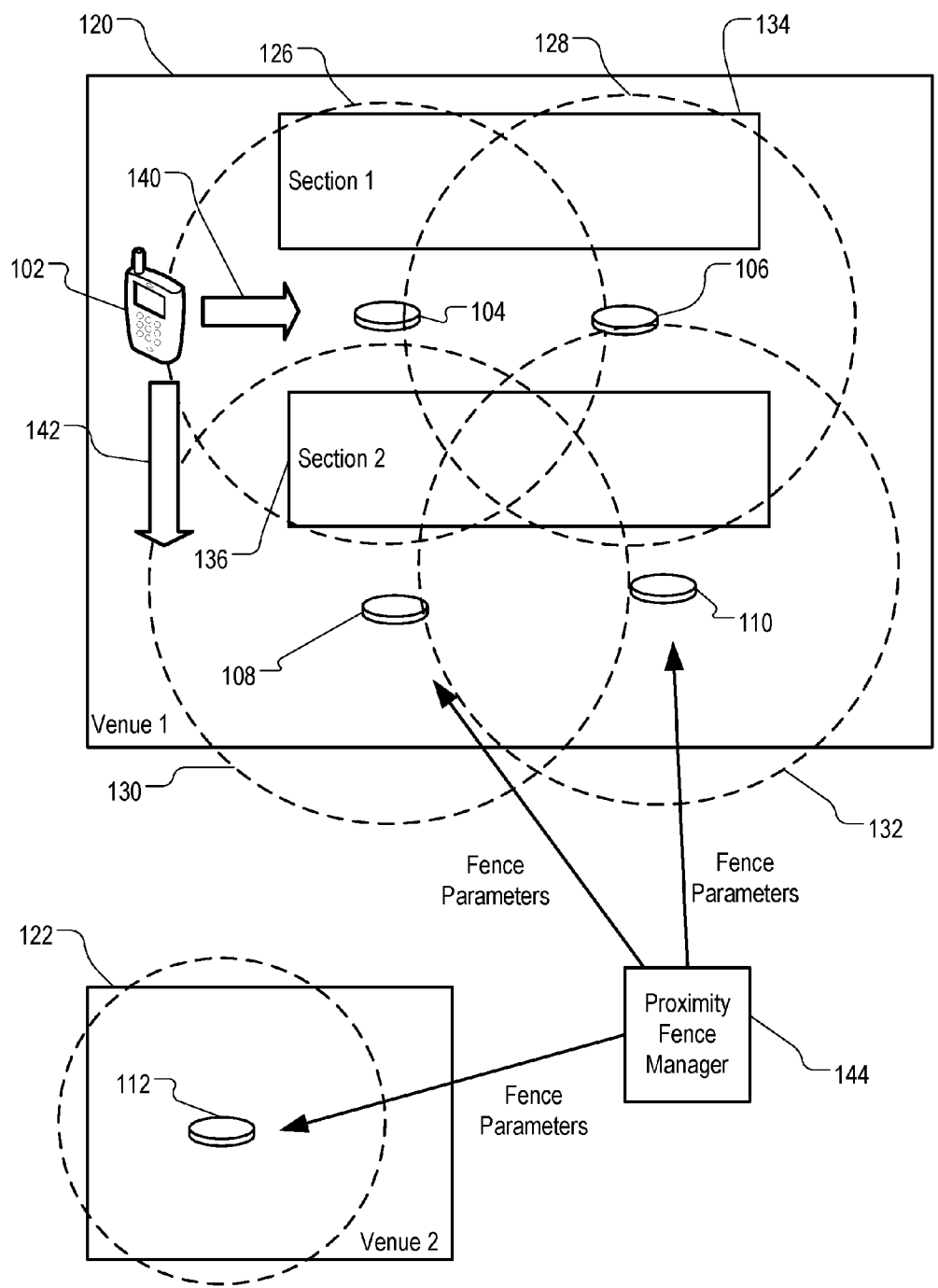
FIG. 1 is a diagram illustrating an exemplary proximity fence.

FIG. 1 is a diagram illustrating an exemplary category-based proximity fence. Mobile device 102 can be an exemplary device programmed to execute an application program when mobile device 102 enters a proximity fence. The proximity fence can be defined by a group of signal sources including, for example, signal sources 104, 106, 108, 110, and 112. In some implementations, signal sources 104, 106, 108, 110, and 112 can be located at different venues. For example, signal sources 104, 106, 108, and 110 can be located at first venue 120, signal source 112 can be located at second venue 122.

Each of signal sources 104, 106, and 108 can be a wireless beacon configured to broadcast an information snippet. In some implementations, signal sources 104, 106, 108, 110, and 112 are radio frequency (RF) transmitters. In some implementations, signal sources 104, 106, 108, 110, and 112 can be Institute of Electrical and Electronics Engineers (IEEE) 802.11u compliant Wi-Fi™ beacons. In some implementations, signal sources 104, 106, 108, 110, and 112 can be Bluetooth™ low energy (BLE) or near field communication (NFC) beacons. Signal sources 104, 106, 108, 110, and 112 can have a same device type or different device types. Each of signal sources 104, 106, 108, 110, and 112 can broadcast a beacon signal through one or more specified channels.

The beacon signals broadcast by each of signal sources 104, 106, 108, 110, and 112 can each include a signal source identifier. The signal source identifier can include a payload having multiple portions. The portions of the payload can each include an identifier corresponding to a high-level proximity fence or a low-level proximity fence, respectively. A high-level proximity fence can include a geographic area corresponding to combined coverage areas of signal sources 104, 106, 108, 110, and 112. Mobile device 102 can be configured to execute an application program upon entering the high-level proximity fence. A low-level proximity fence can be a portion of the high-level proximity fence, e.g., a proximity fence defined by a subset of signal sources 104, 106, 108, 110, and 112. Additional descriptions on the signal source identifiers will be provided below in reference to FIGS. 3A and 3B.

In the example shown, signal sources 104, 106, 108 and 110 each has a communication range that defines a coverage area, e.g., coverage areas 126, 128, 130, and 132, respectively. Each of coverage areas 126, 128, 130, and 132 can be an area that, if mobile device 102 is located in the area, mobile device 102 can detect a beacon signal broadcast from a respective signal source. A size of each of coverage areas 126, 128, 130, and 132 can correspond to the communication range. Coverage areas 126, 128, 130, and 132, in combination, can substantially cover first venue 120. Accordingly, mobile device 102, upon entering first venue 120, can detect a signal from at least one of signal source 104, 106, 108, or 110. Upon detecting a signal from one of signal source 104, 106, 108, or 110, mobile device 102 can determine that mobile device 102 has entered the high-level proximity fence.

Signal sources 104, 106, 108, and 110 can each be placed at a different location at first venue 120. The different locations of signal sources 104, 106, 108, and 110 can each correspond to a low-level proximity fence. Each of signal sources 104, 106, 108, and 110, or a combination of one or more of the signal sources 104, 106, 108, and 110, can define the low-level proximity fence.

If mobile device 102 detects the identifier corresponding to the high-level proximity fence, mobile device 102 can determine that an entry into the high-level proximity fence has occurred. If, in addition, mobile device 102 detects the identifier corresponding to the low-level proximity fence, mobile device 102 can determine that an entry into a low-level proximity fence has occurred. When mobile device 102 detects multiple unique identifiers for low-level proximity fences, mobile device 102 can identify, from the multiple low-level proximity fences, a low-level proximity fence that mobile device 102 has entered. Mobile device 102 can make the identification based on an estimated proximity between mobile device 102 and each of the signal sources broadcasting the distinct identifiers. When mobile device 102 enters a low-level proximity fence, e.g., when mobile device 102 moves sufficiently close to one of the signal sources, mobile device 102 can perform a task in addition to or alternative to a task performed when mobile device enters the high-level proximity fence. For example, mobile device 102 can execute another application program, or perform another function of the application program activated when mobile device 102 entered the high-level proximity fence.

For example, when moving between section 134 and section 136 of first venue 120, mobile device can be in coverage area 126, coverage areas 128 and 128, and coverage area 128, in that order. Mobile device 102 can determine which low-level proximity fence mobile device 102 has entered based on proximity. For example, mobile device 102 can estimate a distance between mobile device 102 and each detected signal source 104, 106, 108, or 110, and estimate the distance using a signal strength, a signal round trip time, a probability density function created by surveying, or a particle filter. Mobile device 102 can determine that mobile device 102 has entered a low-level proximity fence corresponding to a closest signal source.

When mobile device 102 moves in the area between section 134 and section 136 of first venue 120 following path 140, mobile device 102 can determine that, based on proximity to signal sources 104 and 106, mobile device 102 entered a first low-level proximity fence corresponding to signal source 104, and then exited the first low-level proximity fence and entered a second low-level proximity fence corresponding to signal source 106. Likewise, when mobile device 102 moves from section 134 to section 136 following path 142, mobile device 102 can enter a first low-level proximity fence corresponding to signal source 104, and then exited the first low-level proximity fence and entered a third low-level proximity fence corresponding to signal source 108.

The signal source identifier broadcast by signal sources 104, 106, 108, 110, and 112 can be programmed by proximity fence manager 144. Proximity fence manager 144 can include one or more computers configured to cause the signal source identifiers to be stored on each of signal sources 104, 106, 108, 110, and 112.

Figure 2:
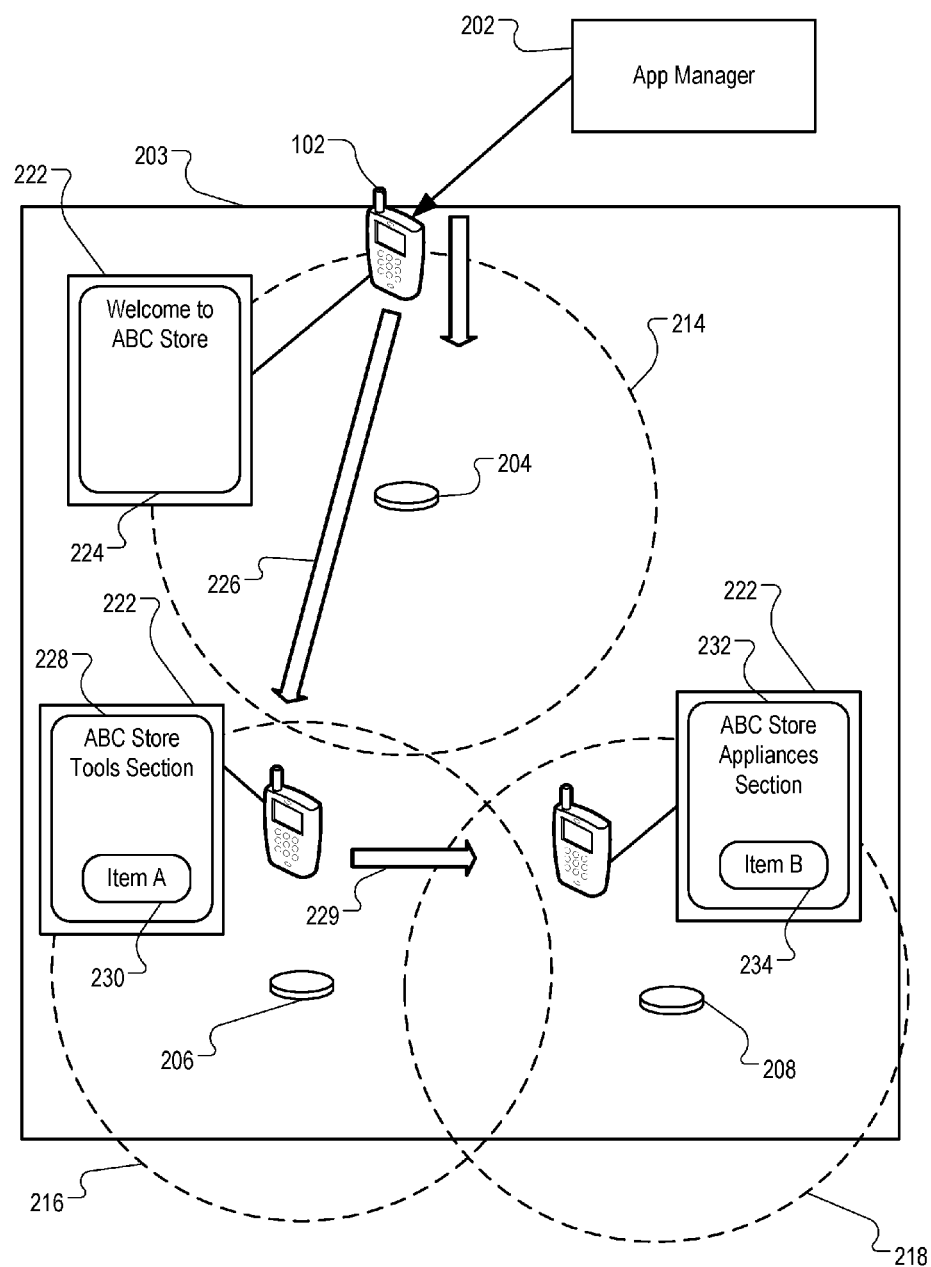
FIG. 2 is a diagram illustrating an exemplary proximity fence triggering different functions of an application program.

FIG. 2 is a diagram illustrating an exemplary proximity fence triggering different functions of an application program. Mobile device 102 can obtain, from application manager 202, an application program. Application manager 202 can include one or more server computers for providing location based services. The application program can be a proximity fence-triggered application program associated with an identifier specifying a high-level proximity fence, e.g., one that is associated with venue 203, and optionally, one or more identifiers specifying one or more low-level proximity fences inside of the high-level proximity fence.

An identifier specifying a high-level proximity fence and an identifier specifying a low-level proximity fence can form a signal source identifier. Each signal source identifier can be stored on a signal source. In the example shown, a unique signal source identifier can be stored on and broadcast by each of signal sources 204, 206, and 208. Each signal source identifier can include a same identifier specifying the high-level proximity fence and a unique identifier specifying a low-level proximity fence.

Mobile device can enter venue 203 and, upon entering venue 203, enter coverage area 214 of signal source 204. Coverage area 214 can correspond to a location of signal source 204 and a communication range of signal source 204. Upon entering coverage area 214, mobile device 102 can detect a beacon signal from signal source 204. The signal can include a signal source identifier. The signal source identifier can include an identifier of the high-level proximity fence (e.g., a proximity fence for "ABC Store" located at venue 203), but no identifier for a low-level proximity fence, or an identifier for a low-level proximity fence corresponding to a general area (e.g., a hall way or a cashier's section of the "ABC Store"). Upon the detection, mobile device 102 can determine that the identifier of the high-level proximity fence corresponds to the application program received from application manager 202. Mobile device 102 can then trigger an execution of the application program. The application program can provide for display, on screen 222 of mobile device 102, user interface 224 corresponding to the high-level proximity fence and the low-level proximity fence corresponding to the general area. For example, the application program can provide a message "Welcome to ABC Store" for display on screen 222.

Mobile device 102 can move along path 226. As mobile device 102 moves, mobile device 102 can get farther away from signal source 204 and closer to signal source 206. When mobile device 102 is in coverage area 216 of signal source 206, mobile device 102 can determine a first distance between mobile device 102 and signal source 204, and a second distance between mobile device 102 and signal source 206. When a function of the first distance and the second distance (e.g., a difference or a ratio) satisfies a threshold, mobile device 102 can determine that mobile device 102 is in proximity of signal source 206. Signal source 206 can broadcast a signal source identifier that includes the same identifier of the high-level proximity fence as broadcast by signal source 204. The signal source identifier can also include a label specifying a low-level proximity fence. The low-level proximity fence can correspond to a specific portion of venue 203, e.g., a "Tools" section of "ABC Store."

Upon detecting the signal source identifier from signal source 206 and identifying the label from the signal source identifier, mobile device 102 can determine that mobile device 102 has entered the low-level proximity fence corresponding to the "Tools" section. Mobile device 102 can trigger the application program to display, on screen 222 of mobile device 102, user interface 228. User interface 228 can correspond to the low-level proximity fence corresponding to the "Tools" section. For example, user interface 228 can include promotional item 230 that relates to the "Tools" section of "ABC Store."

While still in venue 203, mobile device 102 can then move along path 229 to a location that is closer to signal source 208 than to signal source 206. When mobile device 102 is in coverage area 218 of signal source 208, mobile device 102 can detect a signal source identifier from signal source 208. The signal source identifier can include the same identifier of the high-level proximity fence as broadcast by signal sources 204 and 206, and in addition, a label specifying a second low-level proximity fence that is different from the low-level proximity fence as defined by signal source 206. The low-level proximity fence can correspond to a portion of venue 203, e.g., an "Appliances" section of "ABC Store." Upon detecting the label, mobile device 102 can trigger the application program to perform a function related to the low-level proximity fence as defined by signal source 206. For example, the application program can display on screen 222 user interface 232, which can include promotional item 234 that relates to the "Appliances" section of "ABC Store."

Exemplary Signal Source Identifiers

Figure 3A:
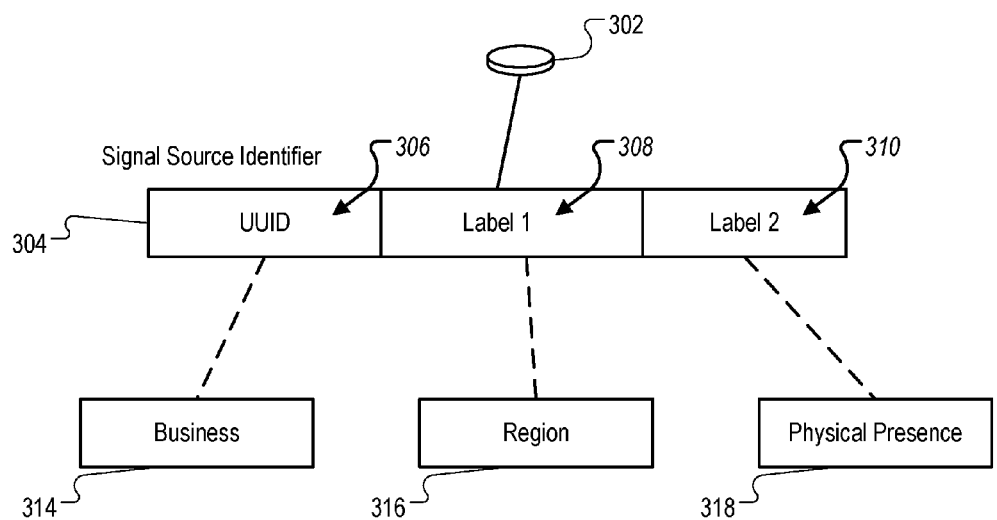
FIGS. 3A and 3B illustrate exemplary structure of a signal source identifier of a signal source in a proximity fence.

FIG. 3A illustrates an exemplary structure of a signal source identifier of a signal source in a proximity fence. Signal source 302 can be a signal source configured to broadcast signal source identifier 304. Signal source identifier 304 can be a programmable data structure having multiple portions. A first portion of signal source identifier 304 can include a universally unique identifier (UUID). The UUID can be a number having a specified size (e.g., 128 bits). The UUID can be unique for a group of signal sources designated to represent a high-level proximity fence, and uniform among the signal sources in the group. For example, the UUID can correspond to business 314 (e.g., "XYZ Burger Chain"). A mobile device (e.g., mobile device 102) that has detected signal source identifier 304 broadcast by any signal source and identified the UUID corresponding to business 314 can be designated has having entered the high-level proximity fence corresponding to business 314.

Signal source identifier 304 can have a second portion and a third portion for storing labels defining a low-level proximity fence. The low-level proximity fence can have multiple tiers. Each of the second portion and third portion of signal source identifier 304 can represent a tier. Each tier can have a distinct geographic granularity.

For example, business 314 may have multiple physical presences in multiple regions. Signal source identifier 304 can have a second portion and a third portion for storing information related to the multiple regions and multiple physical presences. The second portion of signal source identifier 304 can store label 308 that corresponds to region 316 (e.g., California) where business 314 has one or more physical presences. The third portion of signal source identifier 304 can store label 310 that corresponds to physical presence 318 (e.g., an "XYZ Burger" restaurant) located in the region.

Each of the second and third portions can have a same size or distinct sizes. The sizes of the portions of signal source identifier 304 can be determined by the protocol for broadcasting signal source identifier 304 as beacons. In some implementations, the sizes of the first, second, and third portions of signal source identifier 304 can be 16 bytes, one byte, and four bytes, respectively. In some implementations, one or more of the second or third portion of signal source identifier 304 can be empty.

Figure 3B:
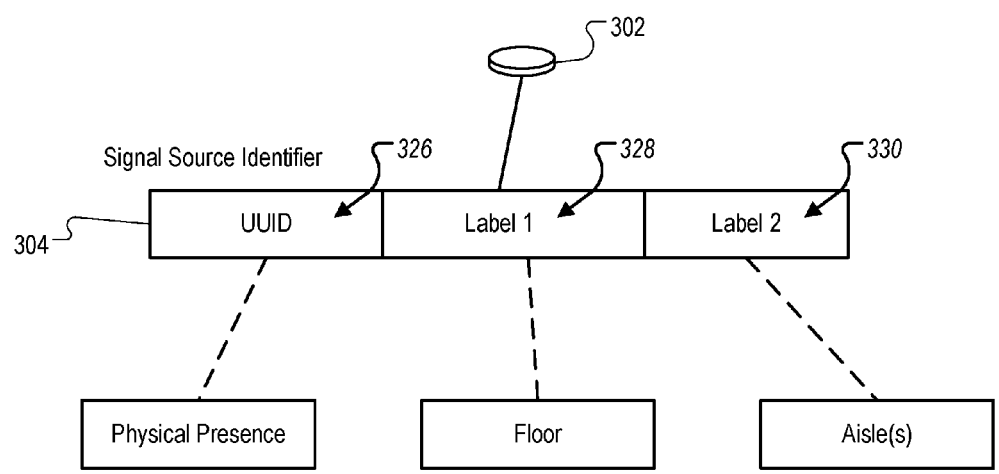

FIG. 3B illustrates an exemplary structure of a signal source identifier of a signal source in a proximity fence having different levels of granularity than those illustrated in FIG. 3A. In FIG. 3B, UUID 326 corresponds to a physical presence of an entity located at a venue. The entity can be a business, school, or government office. The venue can be a building. For example, the physical presence can be "ABC Store" as described in reference to FIG. 2. Label 328 can correspond to a floor of the building where the entity is located. Label 330 can correspond to a particular section (e.g., aisle) of the floor.

Exemplary Device Components

Figure 4:
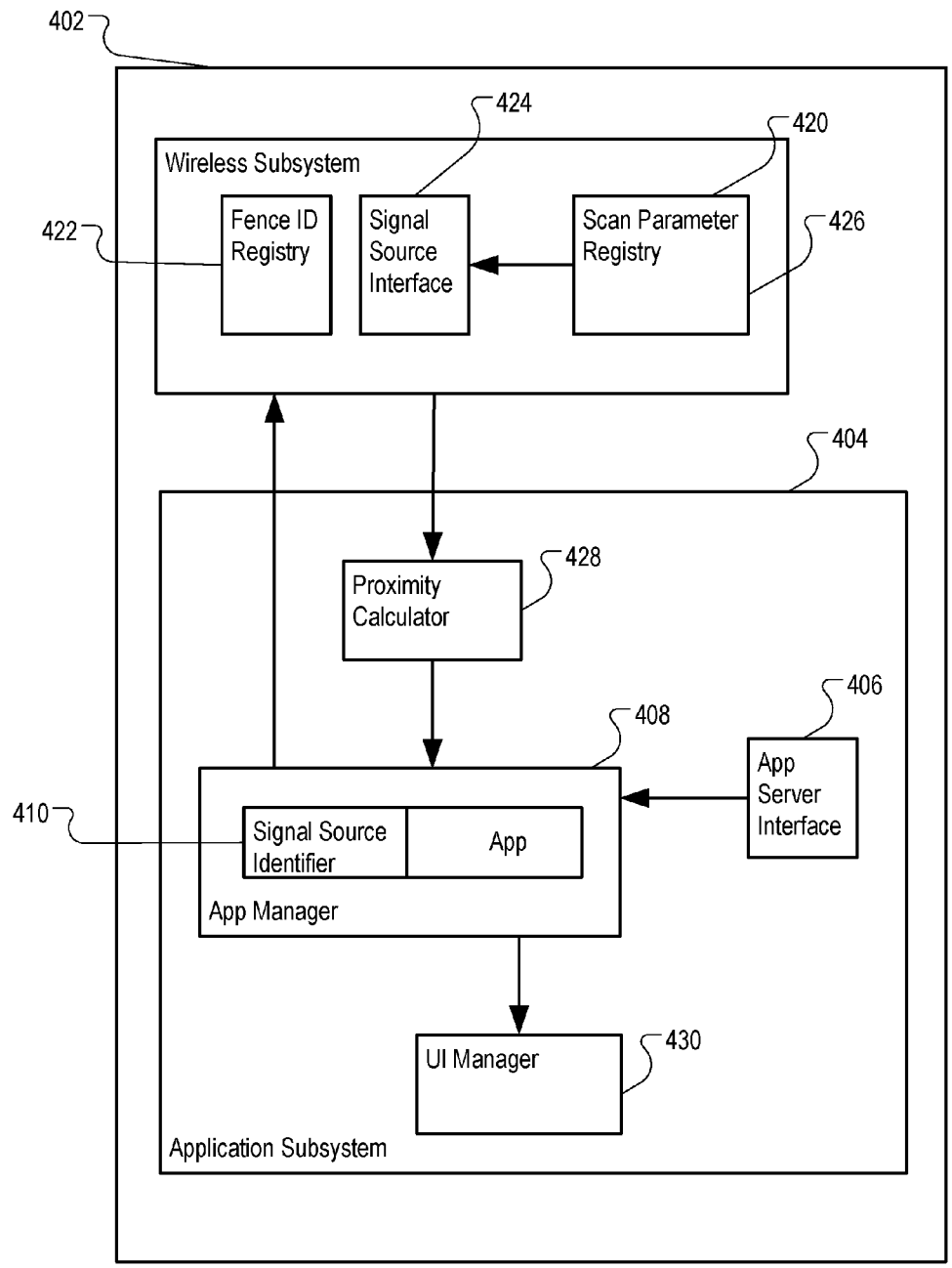
FIG. 4 is a block diagram illustrating components of an exemplary proximity fencing subsystem of a mobile device.

FIG. 4 is a block diagram illustrating components of an exemplary proximity fencing subsystem 402 of mobile device 102. Subsystem 402 can include application subsystem 404. Application subsystem 404 can include one or more processors (e.g., application processors) configured to execute an application program. Application subsystem 404 can include application server interface 406. Application server interface 406 is a component of application subsystem 404 configured to communicate with an application manager (e.g., application manager 202) and receive (e.g., by downloading) one or more application programs from the application manger. Each application program received through application server interface 306 can be associated with a UUID, a UUID with a first label, or a UUID with a first label and a second label. The application program can be triggered by entry into or exit from a high-level proximity fence associated with the UUID.

Application subsystem 404 can include application manager 408. Application manager 408 can be a component of application subsystem 404 configured to store, activate, or deactivate one or more proximity fence-triggered application programs. For example, application manager 408 can store and manage proximity fence-triggered application program 410. In some implementations, proximity fence-triggered application program 410 can be associated with a corresponding UUID and a specification providing that proximity fence-triggered application program 410 should be invoked or deactivated when mobile device 102 enters into or exits from a corresponding proximity fence. In some implementations, proximity fence-triggered application program 410 can be associated with the UUID and one or more labels of low-level proximity fences and corresponding specifications. The specifications of the labels can indicate a proximity threshold that defines a condition, based on distance between mobile device 102 and a detected signal source, on entering or exiting a low-level proximity fence.

Application manager 408 can register the UUID, and in some implementations, the labels, with wireless subsystem 420. Wireless subsystem 420 is a component of proximity fencing subsystem 402 that includes an antenna, a wireless processor (e.g., a baseband processor), and software or firmware. Wireless subsystem 420 can include fence identifier registry 422. Fence identifier registry 422 can store one or more UUIDs, labels, or signal source identifiers including both UUIDs and labels, for scanning. Wireless subsystem 420 can include signal source interface 424. Signal source interface 424 is a component of wireless subsystem 420 including hardware and software configured to scan one or more communication channels for beacon signals from signal sources, to detect signal source identifiers from the scans, and to match the detected signal source identifiers with the fence identifiers stored in fence identifier registry 422. Wireless subsystem 420 can include scan parameter registry 426 configured to store an entry threshold (M), an exit threshold (N), or both. Signal source interface 424 can generate a notification when a signal source identifier matching one of the fence identifiers is detected in at least M scans, or is undetected in at least N scans. Wireless subsystem 420 can provide the notification to application subsystem 404. The notification can include one or more fence identifiers for which a match is detected. In addition, the notification can include measurements associated with the matching fence identifiers. The measurements can include, for example, a received signal strength indication (RSSI), a round trip time for a signal traveled between mobile device 102 and a signal source, a packet error rate, or any combination of the above.

Upon receiving the notification, application subsystem 404 can determine whether mobile device 102 has entered or exited a high-level proximity fence corresponding to the UUID in the matching fence identifier. Based on the entry or exit, application subsystem 404 can activate or deactivate application program 410. In addition, application subsystem 404 can determine, using proximity calculator 428, whether mobile device 102 has entered or exited a low-level proximity fence located within the high-level proximity fence.

Proximity calculator 428 is a component of application subsystem 404 configured to determine, based on the measurements in the notification from wireless subsystem 420, whether mobile device 102 is located in proximity to a signal source. In addition, when the notification includes measurements of signals from multiple signal sources, proximity calculator 428 can determine which one of the multiple signal sources is located closest to mobile device 102. When proximity calculator 428 determines the signal source located closest to mobile device 102, proximity calculator 428 can provide the UUID and labels of that signal source to application manager 408. Based on the labels, application manager 408 can determine which low-level proximity fence mobile device 102 has entered or exited, and invoke a corresponding function of proximity fence-triggered application program 410.

When the application program is activated, the application program can provide for activation a user interface item through user interface manager 430. The user interface item can be a visual item (e.g., a welcome message displayed on a screen), an audio item (e.g., a synthesized or recorded voice message), or a physical item (e.g., vibration of mobile device 102 for reminding a user). The user interface item can have a commonality (e.g., a same store logo) when mobile device 102 is located in various portions of a high-level proximity fence, and differences (e.g., distinct messages) when mobile device 102 is located in different low-level proximity fences within the high-level proximity fence.

Exemplary Procedures

Figure 5:
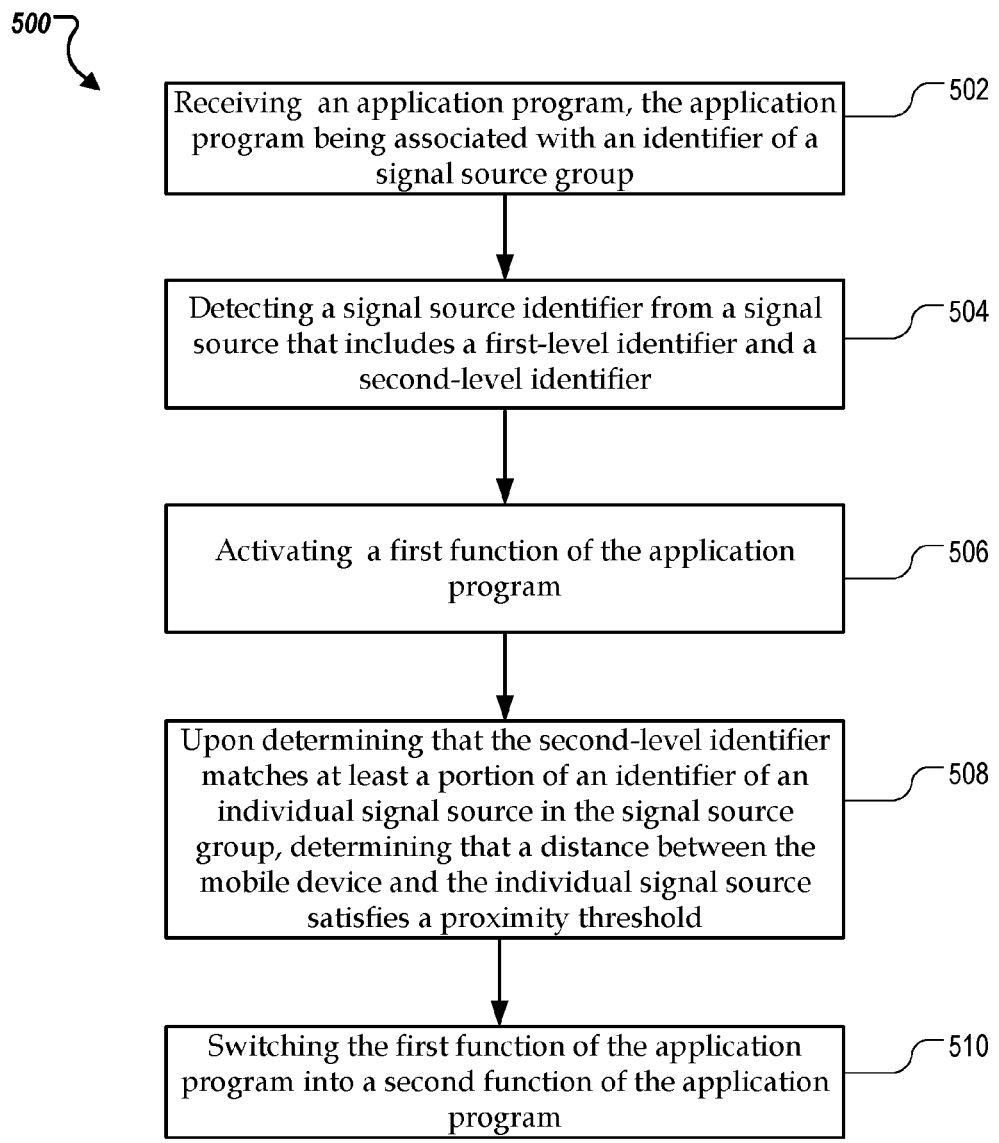
FIG. 5 is a flowchart of an exemplary procedure of triggering an application program using proximity-fence techniques.

FIG. 5 is a flowchart of exemplary procedure 500 of triggering an application program using proximity fencing techniques. Procedure 500 can be performed by mobile device 102.

Mobile device 102 can receive (502) an application program through application server interface 406. The application program can associated with an identifier of a signal source group that includes multiple signal sources. In some implementations, each signal source of the signal source group can be a low energy signal transmitter having a transmission power that is below a transmission power threshold, e.g., a BLE device or an NFC device. In some implementations, each signal source can be a wireless beacon based on IEEE 802.11u technical standard for mobile wireless communication. The identifier of the signal source group can be a UUID shared by each signal source in the group and broadcast by the corresponding signal source.

The signal source group can define a multi-level proximity fence. The multi-level proximity fence can include a high-level proximity fence and a low-level proximity fence. The high-level proximity fence can correspond to, for example, a category of business, a business chain, any organization having multiple locations, or a single venue. The high-level proximity fence need not be defined by latitude and longitude coordinates. The high-level proximity fence can include multiple discrete locations. The low-level proximity fence can be enclosed in the higher-level proximity fence and have a higher level of granularity (e.g., smaller and more precise) than the high-level proximity fence. For example, the low-level proximity fence can correspond to a region in which an organization is located. The high-level proximity fence can include multiple low-level proximity fences. The application program received by mobile device 102 (in stage 502) can be configured to activate upon entering the multi-level proximity fence.

Mobile device 102 can detect (504), using signal source interface 424, a signal source identifier from a signal source. The detected signal source identifier can include a first-level identifier and a second-level identifier. The first level identifier can include a UUID that corresponds to a high-level proximity fence. The second level identifier can include one or more labels corresponding to the low-level proximity fence. For example, the second level identifier includes a first label corresponding to a first tier in the low-level proximity fence, and a second label corresponding to a second tier in the second-level proximity fence. Like the relationship between the low-level proximity fence and the high-level proximity fence, the second tier in the low-level proximity fence can have a higher level of granularity than the first tier in the low-level proximity fence. For example, the first tier of the low-level proximity fence can include a venue having a space accessible by a pedestrian. The second tier of the low-level proximity fence can include a portion of the venue.

Mobile device 102 can determine, using wireless subsystem 420, that the first-level identifier in the detected signal source identifier matches the identifier of the signal source group. Upon such determination, mobile device 102 can activate (506), by application manager 408, a first function of the application program. The first function can include, for example, presenting a user interface item generic to the high-level proximity fence.

Mobile device 102 can determine, using wireless subsystem 420, that the second-level identifier matches at least a portion of an identifier of an individual signal source in the signal source group. Upon such determination, mobile device 102 can determine (508), using proximity calculator 428, that a distance between the mobile device and the individual signal source satisfies a proximity threshold. The proximity threshold can be a pre-specified or real-determined value based on granularity of the second tier in the low-level proximity fence, e.g., the highest level granularity available based on type of the signal sources. For example, when a communication range of each signal source is 50 meters, the proximity threshold can be a value less than 50 meters (e.g., 10 meters).

Upon determining that the distance satisfies the proximity threshold, mobile device 102 can switch (510), using application manager 408, the first function of the application program into a second function of the application program. The second function can be different from the first function. For example, the second function can include presenting a user interface item generic to the high-level proximity fence and, in addition, a user interface item specific to the first tier or second tier of the low-level proximity fence. The user interface item specific to the first tier of the low-level proximity fence can include, for example, information specific to a floor in a building. The user interface item specific to the second tier of the low-level proximity fence can include, for example information specific to an aisle on that floor.

Exemplary Mobile Device Architecture

Figure 6:
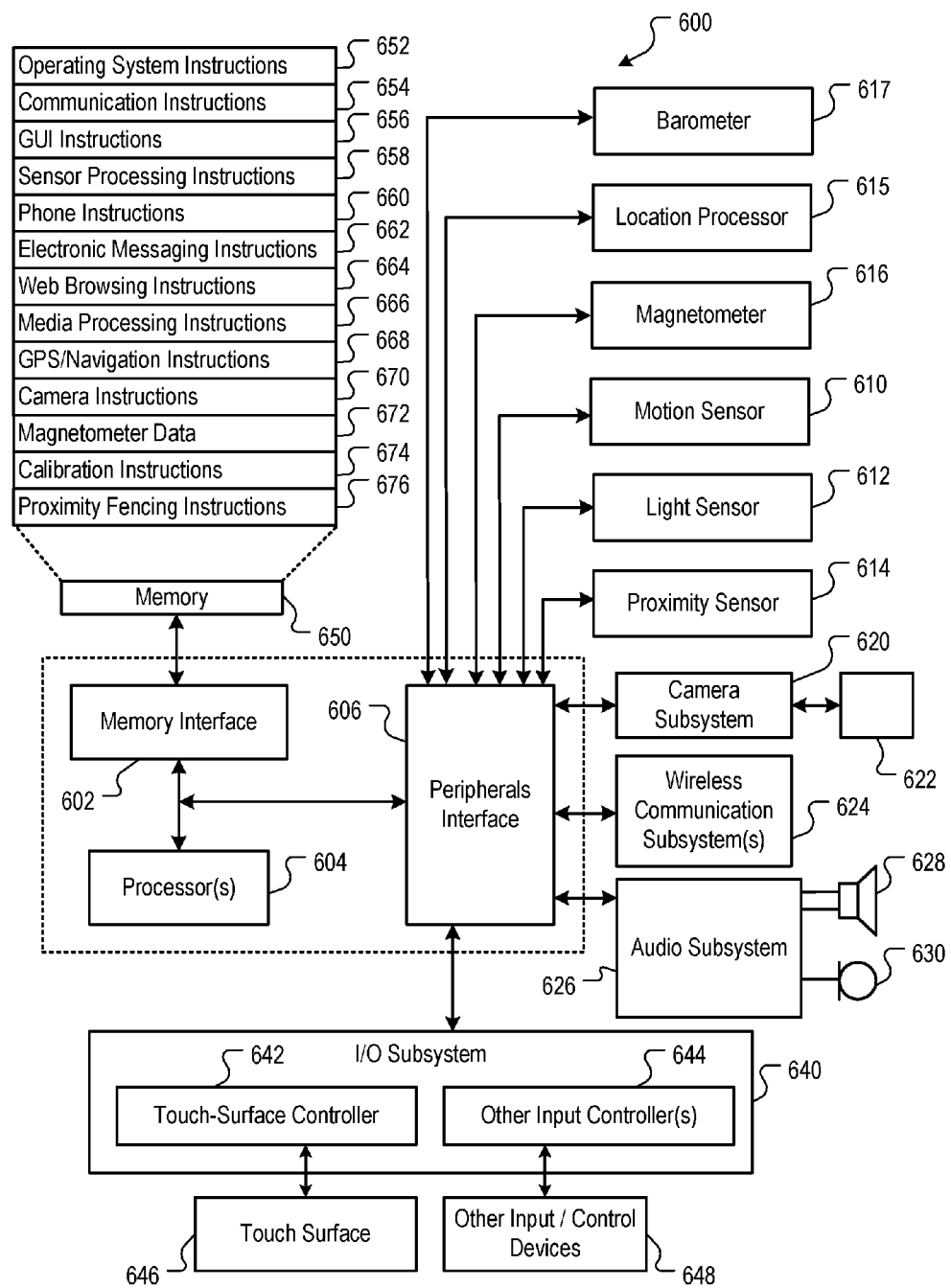
FIG. 6 is a block diagram illustrating an exemplary device architecture of a mobile device implementing the features and operations of FIGS. 1-5.

FIG. 6 is a block diagram illustrating exemplary device architecture 600 of a mobile device implementing the features and operations of FIGS. 1-5. A mobile device (e.g., mobile device 102) can include memory interface 602, one or more data processors, image processors and/or processors 604, and peripherals interface 606. Memory interface 602, one or more processors 604 and/or peripherals interface 606 can be separate components or can be integrated in one or more integrated circuits. Processors 604 can include application processors, baseband processors, and wireless processors. The various components in mobile device 102, for example, can be coupled by one or more communication buses or signal lines.

Sensors, devices, and subsystems can be coupled to peripherals interface 606 to facilitate multiple functionalities. For example, motion sensor 610, light sensor 612, and proximity sensor 614 can be coupled to peripherals interface 606 to facilitate orientation, lighting, and proximity functions of the mobile device. Location processor 615 (e.g., GPS receiver) can be connected to peripherals interface 606 to provide geopositioning. Electronic magnetometer 616 (e.g., an integrated circuit chip) can also be connected to peripherals interface 606 to provide data that can be used to determine the direction of magnetic North. Thus, electronic magnetometer 616 can be used as an electronic compass. Motion sensor 610 can include one or more accelerometers configured to determine change of speed and direction of movement of the mobile device. Barometer 617 can include one or more devices connected to peripherals interface 606 and configured to measure pressure of atmosphere around the mobile device.

Camera subsystem 620 and an optical sensor 622, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which a mobile device is intended to operate. For example, a mobile device can include communication subsystems 624 designed to operate over a GSM network, a GPRS network, an EDGE network, a Wi-Fi™ or WiMax™ network, and a Bluetooth™ network. In particular, the wireless communication subsystems 624 can include hosting protocols such that the mobile device can be configured as a base station for other wireless devices.

Audio subsystem 626 can be coupled to a speaker 628 and a microphone 630 to facilitate voice-enabled functions, such as voice recognition, voice replication, digital recording, and telephony functions. Audio subsystem 626 can be configured to receive voice commands from the user.

I/O subsystem 640 can include touch surface controller 642 and/or other input controller(s) 644. Touch surface controller 642 can be coupled to a touch surface 646 or pad. Touch surface 646 and touch surface controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 646. Touch surface 646 can include, for example, a touch screen.

Other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of speaker 628 and/or microphone 630.

In one implementation, a pressing of the button for a first duration may disengage a lock of the touch surface 646; and a pressing of the button for a second duration that is longer than the first duration may turn power to mobile device 102 on or off. The user may be able to customize a functionality of one or more of the buttons. The touch surface 646 can, for example, also be used to implement virtual or soft buttons and/or a keyboard.

In some implementations, mobile device 102 can present recorded audio and/or video files, such as MP3, AAC, and MPEG files. In some implementations, mobile device 102 can include the functionality of an MP3 player. Mobile device 102 may, therefore, include a pin connector that is compatible with the iPod. Other input/output and control devices can also be used.

Memory interface 602 can be coupled to memory 650. Memory 650 can include high-speed random access memory and/or non-volatile memory, such as one or more magnetic disk storage devices, one or more optical storage devices, and/or flash memory (e.g., NAND, NOR). Memory 650 can store operating system 652, such as Darwin, RTXC, LINUX, UNIX, OS X, WINDOWS, or an embedded operating system such as VxWorks. Operating system 652 may include instructions for handling basic system services and for performing hardware dependent tasks. In some implementations, operating system 652 can include a kernel (e.g., UNIX kernel).

Memory 650 may also store communication instructions 654 to facilitate communicating with one or more additional devices, one or more computers and/or one or more servers. Memory 650 may include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate GPS and navigation-related processes and instructions; camera instructions 670 to facilitate camera-related processes and functions; magnetometer data 672 and calibration instructions 674 to facilitate magnetometer calibration. The memory 650 may also store other software instructions (not shown), such as security instructions, web video instructions to facilitate web video-related processes and functions, and/or web shopping instructions to facilitate web shopping-related processes and functions. In some implementations, the media processing instructions 666 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 650. Memory 650 can store fencing instructions 676 that, when executed, can cause processor 604 to perform operations of generating a proximity fence-triggered application or requesting a proximity fence-triggered application from a server, managing the proximity fence-triggered application program, invoking the proximity fence-triggered application program upon notification that mobile device 102 has entered or exited a high-level or low-level proximity fence, and switching application programs or functions of an application program when mobile device moves from one low-level proximity fence to another low-level proximity fence.

Each of the above identified instructions and applications can correspond to a set of instructions for performing one or more functions described above. These instructions need not be implemented as separate software programs, procedures, or modules. Memory 650 can include additional instructions or fewer instructions. Furthermore, various functions of the mobile device may be implemented in hardware and/or in software, including in one or more signal processing and/or application specific integrated circuits.

Exemplary Operating Environment

Figure 7:
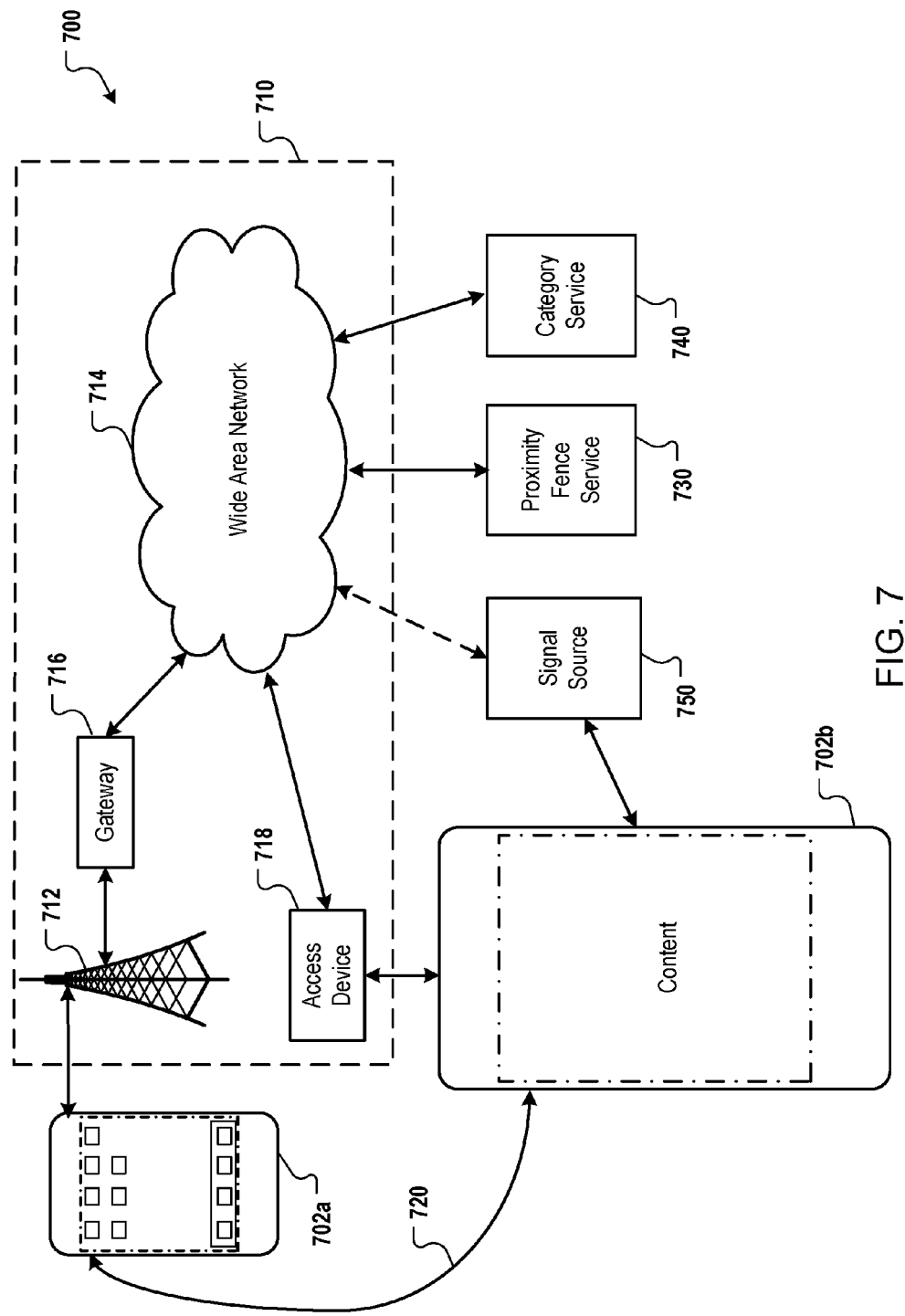
FIG. 7 is a block diagram of an exemplary network operating environment for the mobile devices implementing the features and operations of FIGS. 1-5.

FIG. 7 is a block diagram of exemplary network operating environment 700 for the mobile devices implementing the features and operations of FIGS. 1-5. Mobile devices 702a and 702b can, for example, communicate over one or more wired and/or wireless networks 710 in data communication. For example, a wireless network 712, e.g., a cellular network, can communicate with a wide area network (WAN) 714, such as the Internet, by use of a gateway 716. Likewise, an access device 718, such as an 802.11g wireless access point, can provide communication access to the wide area network 714. Each of mobile devices 702a and 702b can be mobile device 102.

In some implementations, both voice and data communications can be established over wireless network 712 and the access device 718. For example, mobile device 702a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 712, gateway 716, and wide area network 714 (e.g., using Transmission Control Protocol/Internet Protocol (TCP/IP) or User Datagram Protocol (UDP)). Likewise, in some implementations, the mobile device 702b can place and receive phone calls, send and receive e-mail messages, and retrieve electronic documents over the access device 718 and the wide area network 714. In some implementations, mobile device 702a or 702b can be physically connected to the access device 718 using one or more cables and the access device 718 can be a personal computer. In this configuration, mobile device 702a or 702b can be referred to as a "tethered" device.

Mobile devices 702a and 702b can also establish communications by other means. For example, wireless device 702a can communicate with other wireless devices, e.g., other mobile devices, cell phones, etc., over the wireless network 712. Likewise, mobile devices 702a and 702b can establish peer-to-peer communications 720, e.g., a personal area network, by use of one or more communication subsystems, such as the Bluetooth™ communication devices. Other communication protocols and topologies can also be implemented.

Mobile device 702a or 702b can, for example, communicate with one or more services 730 and 740 over the one or more wired and/or wireless networks. For example, one or more proximity fence services 730 can provide proximity fence-triggered application programs and associated identifiers to mobile devices 702a and 702b. Category service 740 can provide published categories (e.g., businesses or organizations) and corresponding UUIDs to mobile devices 702a and 702b such that a user of mobile devices 702a and 702b can add a signal source to a high-level proximity fence of a category by storing the UUID corresponding to the category to the signal source, or modify a category of a signal source by changing the UUID stored on the signal source.

Mobile device 702a or 702b can communicate with one or more signal sources 750. Each signal source 750 can be a wireless beacon configured to broadcast a signal source identifier. The signal source identifier can include a UUID and one or more labels corresponding to the high-level and low-level proximity fences, respectively. Each signal source 750 can communicate to other devices through wide area network 714 or facilitate communication between mobile device 702a or 702b with the other devices. In some implementations, each signal source 750 can be independent from a communications network, and function solely as beacons of proximity fences.

Mobile device 702a or 702b can also access other data and content over the one or more wired and/or wireless networks. For example, content publishers, such as news sites, Really Simple Syndication (RSS) feeds, web sites, blogs, social networking sites, developer networks, etc., can be accessed by mobile device 702a or 702b. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention.

What is claimed is:

1. A method comprising:
representing, on a mobile device, a building by a virtual fence including a plurality of wireless signal sources, the virtual fence being associated with a plurality of actions;
grouping the wireless signal sources in a hierarchy having a first level associated with one or more first level zones in the building and a second level associated with a plurality of second level zones in the building;
associating each wireless signal source with a same first level zone;
associating each wireless signal source with a respective second level zone;
detecting, by the mobile device, a wireless signal source of the virtual fence;
determining, by the mobile device, the first level zone associated with the detected wireless signal source and a second level zone associated with the detected wireless signal source;
in response to a first event, performing, by the mobile device, a first action that corresponds to the first level zone; and
in response to a second event, performing, by the mobile device, a second action that corresponds to the second level zone.

2. The method of claim 1, wherein the virtual fence is a location-agnostic virtual fence.

3. The method of claim 2, wherein each of the first event and the second event includes a movement of the mobile device into a respective zone.

4. The method of claim 1, wherein the first level is a level corresponding to the building, the second level is a level corresponding to a section of the building.

5. The method of claim 1, wherein each of the wireless signal sources includes a Bluetooth™ low energy (BLE) device or a near field communication (NFC) device.

6. The method of claim 1, wherein each of the first action and the second action includes executing an application program that is associated with the building, the first action includes presenting a first message, the second action includes presenting a second message that is different from the first message.

7. The method of claim 6, wherein the application program is launched in response to determining that the mobile device is located in the building.

8. A mobile device comprising:
one or more processors; and
at least one nontransitory storage device storing instructions operable to cause the one or more processors to perform operations including:
representing, on the mobile device, a building by a virtual fence including a plurality of wireless signal sources, the virtual fence being associated with a plurality of actions;
grouping the wireless signal sources in a hierarchy having a first level associated with one or more first level zones in the building and a second level associated with a plurality of second level zones in the building;
associating each wireless signal source with a same first level zone;
associating each wireless signal source with a respective second level zone;
detecting, by the mobile device, a wireless signal source of the virtual fence;
determining, by the mobile device, the first level zone associated with the detected wireless signal source and a second level zone associated with the detected wireless signal source;
in response to a first event, performing, by the mobile device, a first action that corresponds to the first level zone; and
in response to a second event, performing, by the mobile device, a second action that corresponds to the second level zone.

9. The mobile device of claim 8, wherein the virtual fence is a location-agnostic virtual fence.

10. The mobile device of claim 9, wherein each of the first event and the second event includes a movement of the mobile device into a respective zone.

11. The mobile device of claim 8, wherein the first level is a level corresponding to the building, the second level is a level corresponding to a section of the building.

12. The mobile device of claim 8, wherein each of the wireless signal sources includes a Bluetooth™ low energy (BLE) device or a near field communication (NFC) device.

13. The mobile device of claim 8, wherein each of the first action and the second action includes executing an application program that is associated with the building, the first action includes presenting a first message, the second action includes presenting a second message that is different from the first message.

14. The mobile device of claim 13, wherein the application program is launched in response to determining that the mobile device is located in the building.

15. At least one non-transitory storage device storing computer instructions operable to cause one or more processors to perform operations including:
   representing, on a mobile device, a building by a virtual fence including a plurality of wireless signal sources, the virtual fence being associated with a plurality of actions;
      grouping the wireless signal sources in a hierarchy having a first level associated with one or more first level zones in the building and a second level associated with a plurality of second level zones in the building;
      associating each wireless signal source with a same first level zone;
      associating each wireless signal source with a respective second level zone;
      detecting, by the mobile device, a wireless signal source of the virtual fence;
      determining, by the mobile device, the first level zone associated with the detected wireless signal source and a second level zone associated with the detected wireless signal source;
      in response to a first event, performing, by the mobile device, a first action that corresponds to the first level zone; and
      in response to a second event, performing, by the mobile device, a second action that corresponds to the second level zone.

16. The non-transitory storage device of claim 15, wherein the virtual fence is a location-agnostic virtual fence.

17. The non-transitory storage device of claim 16, wherein each of the first event and the second event includes a movement of the mobile device into a respective zone.

18. The non-transitory storage device of claim 15, wherein the first level is a level corresponding to the building, the second level is a level corresponding to a section of the building.

19. The non-transitory storage device of claim 15, wherein each of the wireless signal sources includes a Bluetooth™ low energy (BLE) device or a near field communication (NFC) device.

20. The non-transitory storage device of claim 15, wherein each of the first action and the second action includes executing an application program that is associated with the building, the first action includes presenting a first message, the second action includes presenting a second message that is different from the first message.

* * * * *